Oct. 14, 1924.

R. G. ZAHALAN

DIRECTION SIGNAL FOR AUTOMOBILES

Filed Nov. 2, 1923

1,511,252

INVENTOR
RICHARD G. ZAHALAN
BY Fetherstonhaugh & Co
ATTORNEYS

Patented Oct. 14, 1924.

1,511,252

UNITED STATES PATENT OFFICE.

RICHARD G. ZAHALAN, OF MONTREAL, QUEBEC, CANADA.

DIRECTION SIGNAL FOR AUTOMOBILES.

Application filed November 2, 1923. Serial No. 672,335.

*To all whom it may concern:*

Be it known that I, RICHARD G. ZAHALAN, a subject of the King of Great Britain, and resident of the city of Montreal, in the Province of Quebec and Dominion of Canada, have invented certain new and useful Improvements in Direction Signals for Automobiles, of which the following is a full, clear, and exact description.

This invention relates to new and useful improvements in direction signals for automobiles and the like, and the object of the invention is to provide a simple, inexpensive and efficient device for notifying front and rear traffic of the vehicle driver's intention to turn either to the right or to the left.

Another object is to provide a device which will be easily attached to all standard makes of machines without much alteration.

A still further object is to provide a device manually operated, which will be illuminated at night time for night signalling.

In my invention, I provide a direction signal for vehicles, which consists, of rotatably mounted front and rear signals, which are connected together so that they move simultaneously when operated by the driver. The signals are made of hollow frames, in which may be mounted electric lamps or other illuminating means for night signalling. The lamps are fixedly mounted on vertical spindles, which are rotatably mounted in bearings attached in a suitable manner to the front and rear of a vehicle or the hood of same. A double lever or the like is attached to the vertical spindles and is connected by rods, wires or the like. A hand lever is securely attached to the front spindle and in close proximity to the driver for operating the device.

Figure 2:
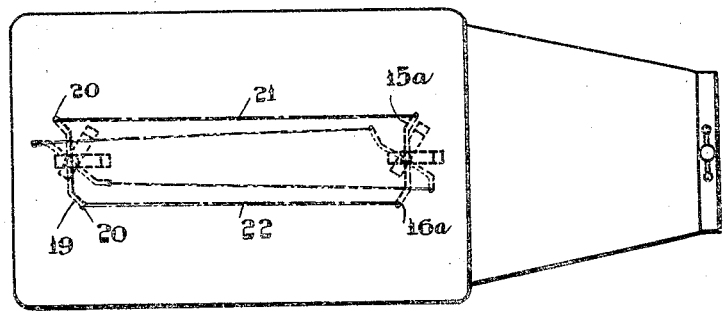
Fig. 2 is a plan view of Figure 1.
Figure 1:
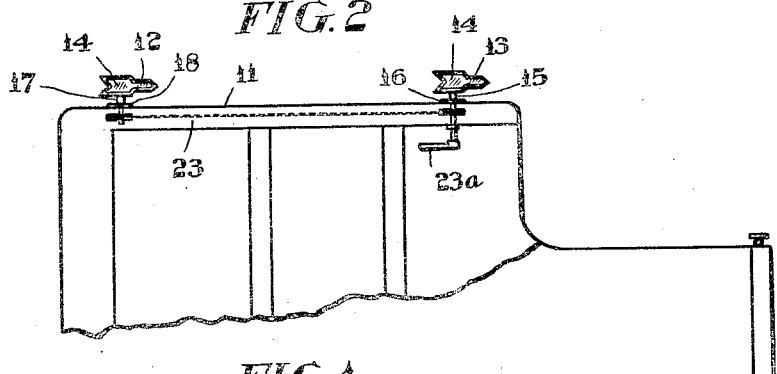
Fig. 1 is a side elevation of an automobile with the direction signals attached thereto.
Figure 3:
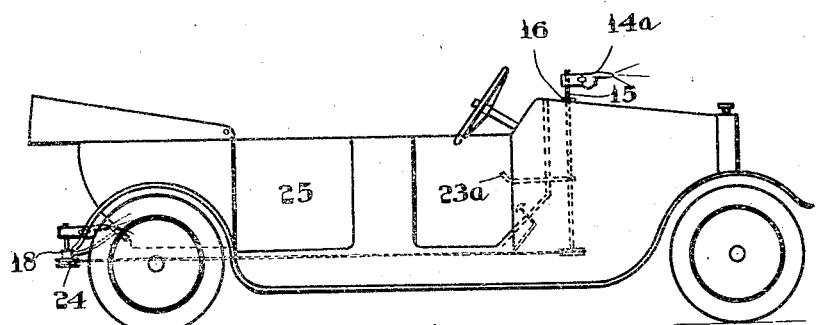
Fig. 3 is an elevation of one modification of the device.

Referring more particularly to the drawings, 11 designates the roof of the tonneau of an automobile and mounted near the front and rear of said roof are the rotatable signals 12 and 13 respectively. These signals are of hollow construction and are provided within with illuminating means, such as electric lamps or the like. The sides 14 of the casing forming the signals may be made of glass or other transparent material and may be made in the form of an arrow, as shown in Figure 1, or a pointing hand, as shown in Figure 3 and designated 14$^a$. The glass may be colored to suit any desired road regulations for any country, but in my preferred form the front signal is colored red and the rear signal green. The front signal is rigidly attached to a vertical spindle 15, which is rotatably mounted in suitable bearings 16 provided for this purpose. Securely attached to the spindle and under cover of the roof or the body of the car is the double-ended lever 15$^a$ adapted to rotate with the spindle. The ends 16$^a$ of the lever are bent to form an angle with a line passing through the centre of the straight portion. The ends are bent one on each side of the centre line. The rear signal is similarly mounted on a spindle 17, which is adapted to rotate in bearings 18 provided for this purpose. The rear spindle 17 is also provided with a lever 19 rigidly attached to the spindle and adapted to rotate with same. The lever 19 is also provided with its ends 20 forming angles with the main body of the lever. The levers are so mounted that when the main body of the front lever is forming a right angle with a centre line passing through the centre of the spindles and the main body of the back lever is lying parallel to the front lever, the rod or connecting cord 21 connecting the ends of the levers on one side of the centre line will be longer than the cord 22 connecting the lever ends on the other side of the centre line. The connecting cords may be mounted as shown in Figure 1 between the cushion 23 and the upper cover of the tonneau. The front spindle is extended and is provided with an operating handle 23$^a$ in close proximity to the driver. The handle is securely attached to the front spindle and is adapted to turn the spindle on the movement of the handle.

Figure 4:
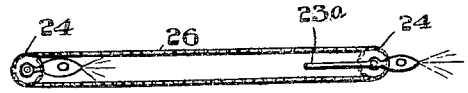
Fig. 4 is a plan view of the operating mechanism shown in Figure 3.

The foregoing is my preferred form of direction signal but modifications may be made, as shown in Figures 3 and 4, which show the front and rear spindles extending below the bottom of the tonneau 25 and sprockets 24 may be securely mounted on the spindles. An endless chain or like connection 26 may be used as an operating element, so that on operation of the handle 23ª both the signals will be simultaneously operated to turn the signals in the same direction.

The operation of the device is as follows:—

To signal a turning to the left, the operating handle is turned to the right, thereby operating the front signal and the lever attached to the front spindle. This lever is connected to the rear signal lever and thus turns the rear spindle to operate the rear signal attached thereto. By turning the handle to the left, a right hand turning is indicated.

Having thus described my invention, what I claim is:—

1. A direction signal for vehicles comprising a pair of rotatably mounted direction indicators, double-ended levers rigidly attached to said indicators, means connecting the ends of the front lever with the ends of the back lever, and an operating handle securely attached to one of said indicators.

2. A direction signal for automobiles or the like, comprising front and rear spindles rotatably mounted at the front and rear of the vehicle, direction indicators securely attached to the front and rear spindles, double-ended levers securely attached to the spindles with the ends of the levers bent a short distance from their ends to form an angle with the main body of the lever, one end of each lever being bent on one side of a centre line passing through the centre line of the lever, the other being bent towards the opposite side of the said centre line, means to connect the ends of the levers, and a handle rigidly attached to the front spindle and in close proximity to the driver's seat of the automobile or the like.

3. A device according to claim 2, in which the connecting means for the lever ends is situated one on each side of the centre line passing through the centre of the spindles, and one connecting means for the lever ends being slightly shorter than the means connecting the levers on the other side of the centre line.

In witness whereof, I have hereunto set my hand.

RICHARD G. ZAHALAN.